(12) United States Patent
Ren (10) Patent No.: US 12,259,209 B2
(45) Date of Patent: Mar. 25, 2025

(54) THREE-MODE TOY GUN (71) Applicant: Beautiful toys Technology Co., Ltd, Shantou (CN)

(72) Inventor: Lijun Ren, Tangshan (CN)

(73) Assignee: BEAUTIFUL TOYS TECHNOLOGY CO., LTD., Shantou (CN)

( * ) Notice: Subject to any disclaimer, the term of this patent is extended or adjusted under 35 U.S.C. 154(b) by 14 days.

(21) Appl. No.: 18/347,791

(22) Filed: Jul. 6, 2023

(65) Prior Publication Data

US 2023/0349666 A1 Nov. 2, 2023

(30) Foreign Application Priority Data

May 24, 2023 (CN) .......................... 202310588765.0

(51) Int. Cl.
*F41B 11/71* (2013.01)
*F41A 19/64* (2006.01)
*F41B 11/70* (2013.01)
*F41B 11/89* (2013.01)

(52) U.S. Cl.
CPC .............. *F41B 11/89* (2013.01); *F41A 19/64* (2013.01); *F41B 11/70* (2013.01)

(58) Field of Classification Search
CPC .................................. F41B 7/003; F41B 7/08
See application file for complete search history.

(56) References Cited

U.S. PATENT DOCUMENTS

| | | | | |
|---|---|---|---|---|
| 6,564,788 B1* | 5/2003 | Hu | .......................... | F41B 11/52 124/66 |
| 7,100,592 B1* | 9/2006 | Yang | ......................... | F41B 7/00 124/67 |
| 7,841,329 B2* | 11/2010 | Yang | ....................... | F41B 11/71 124/66 |
| 7,975,682 B2* | 7/2011 | Yang | ..................... | F41B 11/642 124/66 |
| 8,800,541 B2* | 8/2014 | Hu | .......................... | F41A 33/06 124/66 |
| 9,121,660 B2* | 9/2015 | Yang | ..................... | F41B 11/646 |
| 11,644,271 B1* | 5/2023 | Huang | ..................... | F41B 11/89 124/56 |
| 2006/0064911 A1* | 3/2006 | Lewis | ................... | F41B 11/648 42/54 |
| 2008/0087261 A1 | 4/2008 | Slaven | | |

(Continued)

Primary Examiner — Derrick R Morgan
(74) Attorney, Agent, or Firm — Hemisphere Law, PLLC; Zhigang Ma (57) ABSTRACT

This application discloses a three-mode toy gun which comprises a gun shell, a firing cylinder assembly, a transmission gear train, a mating member and a trigger mechanism. An electric drive mechanism comprises a motor and a power supply cable having a first switch and a second switch connected in series. The mating member is movably provided in the gun shell, and the mating member has a first position, a second position and a third position. The trigger mechanism is arranged in the gun shell, and the trigger mechanism has a trigger and a convex bar. The three-mode toy gun is provided with a single-action mode, an automatic mode and a manual mode by means of mating arrangement of the structural members, which provides players with three use experiences and satisfies the preferences of different players.

6 Claims, 10 Drawing Sheets

(56) References Cited

U.S. PATENT DOCUMENTS

| | | | | |
|---|---|---|---|---|
| 2010/0065032 A1* | 3/2010 | Yang | ................... | F41B 11/646 |
| | | | | 124/27 |
| 2010/0065033 A1* | 3/2010 | Yang | ................... | F41B 11/642 |
| | | | | 124/66 |
| 2011/0265775 A1 | 11/2011 | Maeda | | |
| 2016/0084611 A1* | 3/2016 | Wong | ................... | F41B 11/89 |
| | | | | 124/31 |
| 2020/0141672 A1* | 5/2020 | Silva | ................... | F41B 11/71 |
| 2023/0408220 A1* | 12/2023 | Davis | ................... | F41A 19/64 |

* cited by examiner

THREE-MODE TOY GUN

TECHNICAL FIELD

The invention pertains to the field of toy products, and specifically pertains to a three-mode toy gun.

BACKGROUND

Toy guns are popular among children and young people and are commonly used in games and sports activities such as hunting games, fighting or war games. Toy guns are generally designed to resemble real guns and are also provided with glare and sound effects to create a sense of reality, thus making the toy gun more attractive to players.

Existing toy guns are generally divided into three types, the first type is a purely manual gun that requires a user to manually pull an air cylinder to a tail portion of the gun shell to snap on and fix the air cylinder. When it is desired to fire a bullet, the trigger is manually pressed to trigger the toy gun to execute the firing action. The second is a single-action toy gun. When the player presses the trigger once, the toy gun fires once, and can not continuously fire. The third type is an automatic toy gun When the player presses the trigger, the Toy gun will continuously execute the firing action, and can continuously fire bullets. The existing toy guns typically have only one or two modes because of the complexity of the structure and the difficulty of integrating the three modes on the same toy gun. There are few toy guns on the market that integrate the three modes simultaneously.

In view of this, the invention is proposed.

SUMMARY

The invention provides a three-mode toy gun.

The present application provides the following technical solutions.

A three-mode toy gun, comprises:

a gun shell;

a firing cylinder assembly, wherein the firing cylinder assembly comprises a loading cylinder, an air cylinder and a piston member, the loading cylinder is fixed to the gun shell, the air cylinder is slidably connected to the loading cylinder, the piston member is slidably connected to the air cylinder, the piston member has a first rack, the air cylinder has a second rack, and a first elastic member is provided between the piston member and the gun shell;

a transmission gear train, wherein an output end gear of the transmission gear train has a first incomplete gear and a second incomplete gear, the first incomplete gear is engageable with the first rack, and the second incomplete gear is engageable with the second rack;

an electric drive mechanism, wherein the electric drive mechanism comprises a motor and a power supply cable, the motor is in transmission connection with an input end gear of the transmission gear train, the power supply cable is electrically connected with the motor, and the power supply cable has a first switch and a second switch connected in series;

a mating member, wherein the mating member is movably arranged in the gun shell, the mating member has a first position, a second position and a third position, the first position is located on a motion trajectory of the piston member, the second position deviates from the motion trajectory, the third position is located on a side where the second position is away from the first position;

a trigger mechanism, wherein the trigger mechanism is arranged in the gun shell, and the trigger mechanism has a trigger and a convex bar;

a mode adjustment plate, wherein the mode adjustment plate is movably arranged in the gun shell, and the mode adjustment plate is in transmission fit with the mating member;

a rotating member, wherein the rotating member is arranged in the gun shell, and the rotating member is rotatable against different positions of the mode adjustment plate, so that the mode adjustment plate limits the mating member to any one of the first position, the second position and the third position;

wherein the three-mode toy gun has a single-action mode, an automatic mode and a manual mode;

in the single-action mode, the mating member is located at the first position, the trigger is pressed such that the convex bar abuts against and triggers the first switch, the electric drive mechanism drives the piston member to move towards a tail portion of the gun shell to compress the first elastic member until the piston member pushes the mating member, so that the mating member pushes against the convex bar, so that the convex bar is disengaged from the first switch, the electric drive mechanism is powered off, and the first elastic member is elastically released to drive the piston member to move in a reverse direction;

in the automatic mode, the mating member is located at the second position, and in a state where the trigger is pressed, the convex bar keeps abutting against the first switch, and the electric drive mechanism remains in a power-on state; and in the manual mode, the mating member is located at the third position, the second switch is trigged and in an off state, and the electric drive mechanism remains in a power-off state.

Optionally, the piston member has a push-down plate, and the push-down plate has a push-down bevel;

the mating member has a mating bevel;

the trigger and the convex bar are rotatably connected, and a second elastic member is provided between the trigger and the convex bar;

a third elastic member is provided between the mating member and the gun shell;

a fourth elastic member is provided between the trigger and the gun shell; and in the single-action mode, the trigger is pressed, the piston member moves towards a tail portion of the gun shell, the push-down bevel can press down the mating bevel, the mating member presses down the convex bar, the first elastic member, the second elastic member, the third elastic member and the fourth elastic member are all in a deformed state, and when the convex bar rotates to disengage from the first switch, the first elastic member and the third elastic member both recover from deformation, the convex bar is limited at a bottom of the first switch; and when the trigger is released, the fourth elastic member recovers from deformation to push against the trigger mechanism away from the first switch, and the second elastic member recovers from deformation to drive the convex bar to rotate to reset.

Optionally, an avoidance groove is provided on the mating member;

in the automatic mode, the convex bar is arranged to at least partially run through the avoidance groove; and the trigger is pressed, so that the convex bar keeps abutting against the first switch.

Optionally, an upper edge of an inner side of the convex bar is provided with an inner convex rib;
the mating member has a lower convex rib and an upper convex rib, the avoidance groove is formed between the lower convex rib and the upper convex rib, and a groove width of the avoidance groove is greater than a width of the inner convex rib; and
in the automatic mode, the mating member moves to the second position, the inner convex rib is located between the upper convex rib and the lower convex rib, and the inner convex rib runs through the avoidance groove.

Optionally, an end portion of the lower convex rib has a smooth outer convex arc surface;
in the single-action mode, the mating member abuts against an end portion of the inner convex rib to drive the convex bar to rotate; and
in a process that the mating member moves from the first position to the second position, the end portion of the inner convex rib slides along the outer convex arc surface and slides into the avoidance groove.

Optionally, the three-mode toy gun comprises a snap-on member movably provided in the gun shell;
the snap-on member is movable in a direction perpendicular to the piston member; and
in the manual mode, the piston member moves towards a gun tail, the piston member is snappable on the snap-on member, the first elastic member is in a compressed state, the trigger is pressed to drive the snap-on member to move, so that the snap-on member is disengaged from the piston member, and the first elastic member is elastically released to push against the piston member to reset.

Optionally, a fifth elastic member is provided between the snap-on member and the gun shell;
the trigger has a lateral push bevel;
one end of the snap-on member away from the fifth elastic member is provided with a lateral push mating bevel; and
in the state where the trigger is pressed, the lateral push bevel is capable of pushing against the lateral push mating bevel, so that the snap-on member moves and compresses the fifth elastic member.

Optionally, the gun shell has a through groove and a support table;
the mating member has an extension;
the support table is located on a side of the extension away from the piston member;
the extension extends to the through groove; and
both ends of the fifth elastic member abut against the extension and the support table respectively.

Optionally, the three-mode toy gun comprises a mode adjustment plate;
two guide ribs are provided on the gun shell;
the mode adjustment plate is slidably arranged between the two guide ribs;
the mode adjustment plate has a holding down plate;
the holding down plate extends to a side of the extension away from the fifth elastic member; and
the mode adjustment plate is movable along the guide ribs to adjust the mating member to the first position or the second position.

Optionally, the mating member has a third position located on a side where the second position is away from the first position;
in a state where the mating member moves to the third position, the inner convex rib runs through the avoidance groove; and
the mode adjustment plate also has a trigger plate, and in a state where the mode adjustment plate drives the mating member to move to the third position, the trigger plate presses the second switch so that the second switch is in an off state.

Optionally, the mode adjustment plate has an adjustment groove and a plurality of guide grooves;
a plurality of guide posts are provided on the gun shell, and each of the guide posts is respectively inserted into a corresponding guide groove; and
the rotating member is arranged in the gun shell, the rotating member is partially located in the adjustment groove, and the rotating member is rotatable to abut against different positions of the adjustment groove, so that the mode adjustment plate limits the mating member to any one of the first position, the second position and the third position.

By adopting the above-mentioned technical solutions, the present application has the following beneficial effects: the three-mode toy gun of the present application has the single-action mode, the automatic mode and the manual mode, which provides players with three use experiences and satisfies the operational preferences of different players.

BRIEF DESCRIPTION OF THE DRAWINGS

The accompanying drawings, which are comprised to provide a further understanding of the invention and are incorporated in and constitute a part of this application, illustrate embodiment(s) of the invention and together with the description serve to explain the invention and not limit the invention in any way. Obviously, the drawings in the following description are only some embodiments of the invention, and for those of ordinary skills in the art, other drawings may be obtained according to these drawings under the premise of not paying out creative work.

In the drawings: 1. gun shell; 1a. first limiting wall; 1b. second limiting wall; 1c. dividing wall; 11. through groove; 12. support table; 13. guide rib; 14. guide post; 2. loading cylinder; 3. air cylinder; 31. second rack; 4. piston member; 41. first rack; 42. push-down plate; 6. transmission gear train; 61. output end gear; 611. first incomplete gear; 612. second incomplete gear; 7. electric drive mechanism; 71. motor; 72. first switch; 73. second switch; 8. mating member; 81. upper convex rib; 82. lower convex rib; 82a. outer convex arc surface; 83. avoidance groove; 84. extension; 9. trigger mechanism; 91. trigger; 92. convex bar; 92a. inner convex rib; a. snap-on member; b. mode adjustment plate; b1. holding down plate; b2. trigger plate; b3. adjustment groove; b4. guide groove; 10. spring seat; 101. first flat plate; 102. second flat plate; 103. connecting shaft; 20. adjustment member; 201. cam; 202. rotating shaft; and 30. rotating member.

DESCRIPTION OF THE EMBODIMENTS

To make the purposes, technical solutions and advantages of the invention clearer, the technical solutions in the embodiments of the invention will be described clearly and completely below in combination with the accompanying drawings in the embodiments of the invention. The following embodiments are used to illustrate the invention, not intended to limit the scope of the invention.

In the description of the invention, it should be noted that the terms "upper", "lower", "inner", "outer" and the like indicate orientations or positional relationships based on the orientations or positional relationships shown in the drawings, and are only for convenience of description and simplification of description, but do not indicate or imply that the device or element to be referred must have a specific orientation, be constructed and be operated in a specific orientation, and thus, should not be construed as limiting the invention.

In the description of the invention, it should be noted that unless otherwise specified and limited, terms "mounted" and "connected" are to be interpreted in broad sense and may, for example, be fixedly or detachably or integrally connected; the connection may be a mechanical connection or an electrical connection; or the connection may be a direct connection or an indirect connection through an intermediary. A person of ordinary skill in the art can understand specific meanings of the terms in the invention based on specific situations.

Referring to FIGS. 1-10, an embodiment of this application provides a three-mode toy gun which comprises a gun shell 1, a firing cylinder assembly, a transmission gear train 6, a mating member 8, a trigger mechanism 9 and a feed cylinder. The firing cylinder assembly comprises a loading cylinder 2, an air cylinder 3 and a piston member 4, the loading cylinder 2 is fixed to the gun shell 1, the air cylinder 3 is slidably connected to the loading cylinder 2, one end of the piston member 4 with a piston body is slidably connected to the air cylinder 3, the piston member 4 has a first rack 41, the air cylinder 3 has a second rack 31, and a first elastic member (not shown) is provided between the piston member 4 and the gun shell 1. The feed cylinder is used to load bullets. An end portion of the air cylinder 3 can extend into the feed cylinder. It should be noted that in the embodiment of this application, the mating structure of the firing cylinder assembly and the feed cylinder adopt existing mature techniques.

Referring to FIGS. 2, 3, 4 and 5, an output end gear 61 of the transmission gear train 6 has a first incomplete gear 611 and a second incomplete gear 612, the first incomplete gear 611 is engageable with the first rack 41, and the second incomplete gear 612 is engageable with the second rack 31.

The feed cylinder has a horizontal cylinder and a vertical cylinder, and cavities of which are connected through a bullet dropping hole. The output end gear 61 of the transmission gear train 6 is used to respectively drive the air cylinder 3 and the piston member 4 to move towards a gun tail, and after the air cylinder 3 moves towards the gun tail, the bullet dropping hole is conducted, and bullets can fall from the vertical cylinder into the horizontal cylinder. Subsequently, since the second incomplete gear 612 has a non-closed ring shape, and the air cylinder 3 is connected to the gun shell 1 through a spring, after the second rack 31 and the second incomplete gear 612 are disengaged, the air cylinder 3 moves to a gun head side to be reset under the action of the spring, and the air cylinder closes the bullet dropping hole again.

It should be noted that the firing cylinder assembly (including the racks), the feed cylinder and the transmission gear train 6 (including the incomplete gears) described above and a snap-on member a described below can all adopt the existing mature technology for their mating relationship, and have the structures substantially the same as those of a common toy gun, and only sizes thereof are improved adaptively.

The electric drive mechanism 7 comprises a motor 71 and a power supply cable (not shown), the motor 71 is in transmission connection with an input end of the transmission gear train 6, the power supply cable is electrically connected with the motor 71, the power supply cable has a first switch 72 and a second switch 73 connected in series, the mating member 8 is movably arranged in the gun shell 1, the mating member 8 has a first position and a second position, the first position is located on a motion trajectory of the piston member 4, and the mating member located at the first position interferes with the piston member 4. The second position deviates from the motion trajectory, and the mating member 8 located at the second position does not interfere with the piston member 4. The trigger mechanism 9 is arranged in the gun shell 1, and the trigger mechanism 9 has a trigger 91 and a convex bar 92.

The three-mode toy gun has a single-action mode, an automatic mode and a manual mode. In the single-action mode, the mating member 8 is located at the first position, the trigger is pressed such that the convex bar 92 abuts against and triggers the first switch 72, the electric drive mechanism 7 drives the piston member to move towards a tail portion of the gun shell 1 to compress the first elastic member until the piston member 4 pushes (interference occurs) the mating member 8, so that the mating member 8 pushes against the convex bar 92, so that the convex bar 92 is disengaged from the first switch 72, the electric drive mechanism 7 is powered off, and the first elastic member is elastically released to drive the piston member to move in a reverse direction to eject bullets. In the automatic mode, the mating member 8 is located at the second position, and in a state where the trigger 91 is pressed, the convex bar 92 keeps abutting against the first switch 72, the electric drive mechanism 7 remains in a power-on state; and The movable piston member does not interfere with the mating member. In the manual mode, the second switch 73 is trigged and in an off state, and the electric drive mechanism 7 remains in a power-off state.

The three-mode toy gun is provided with the single-action mode, the automatic mode and the manual mode by means of mating arrangement of the structural members, which provides players with three use experiences and satisfies the preferences of different players.

Figure 1:
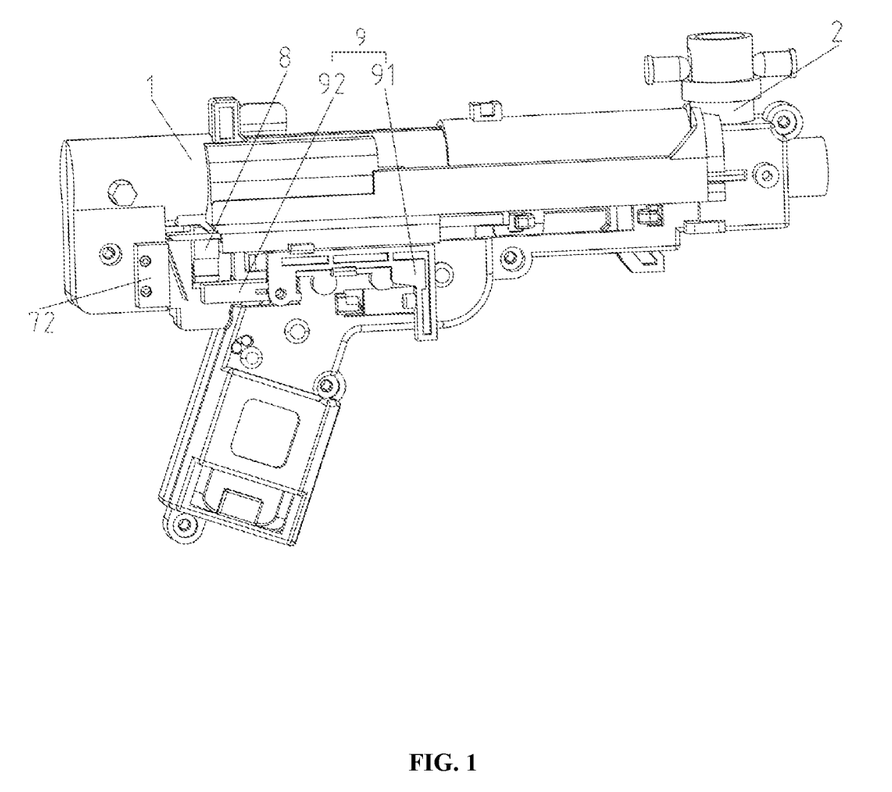
FIG. 1 illustrates a structural diagram of a first side of a three-mode toy gun according to an embodiment of this application.
Figure 2:
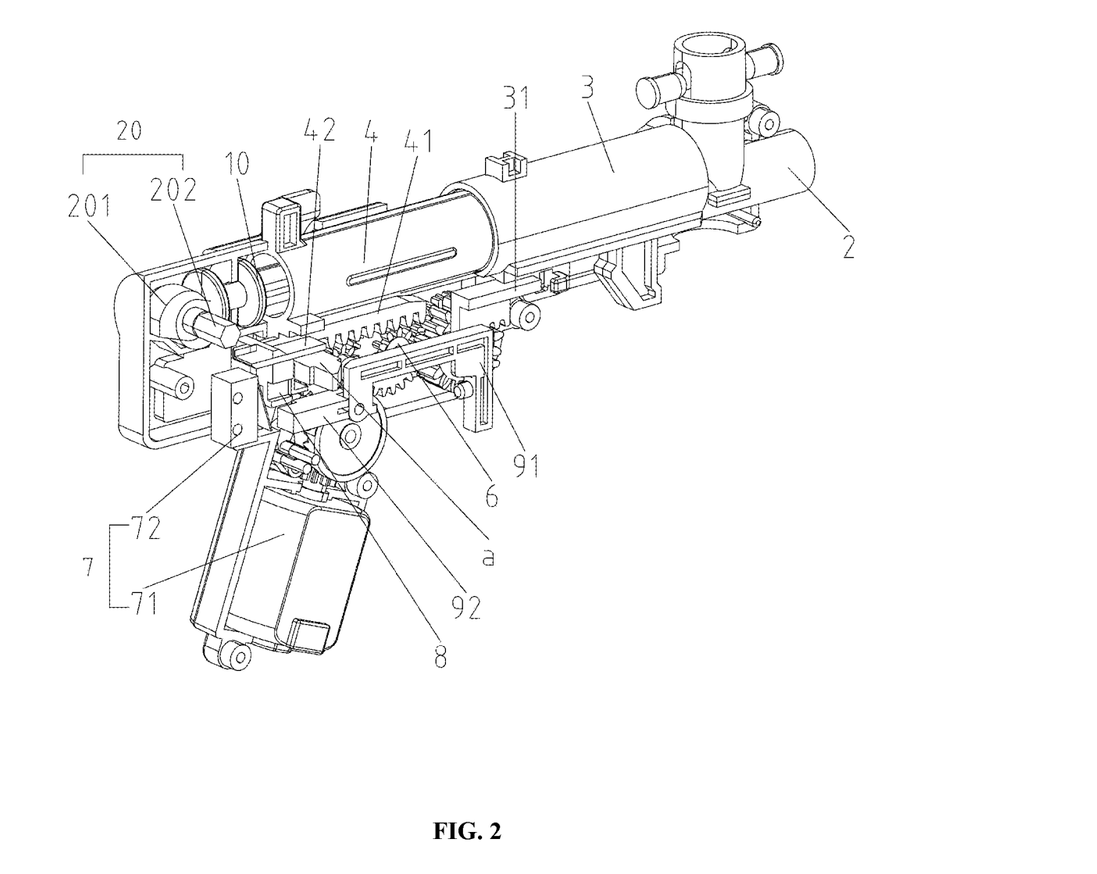
FIG. 2 illustrates a schematic diagram of an internal structure of a three-mode toy gun according to an embodiment of this application.
Figure 3:
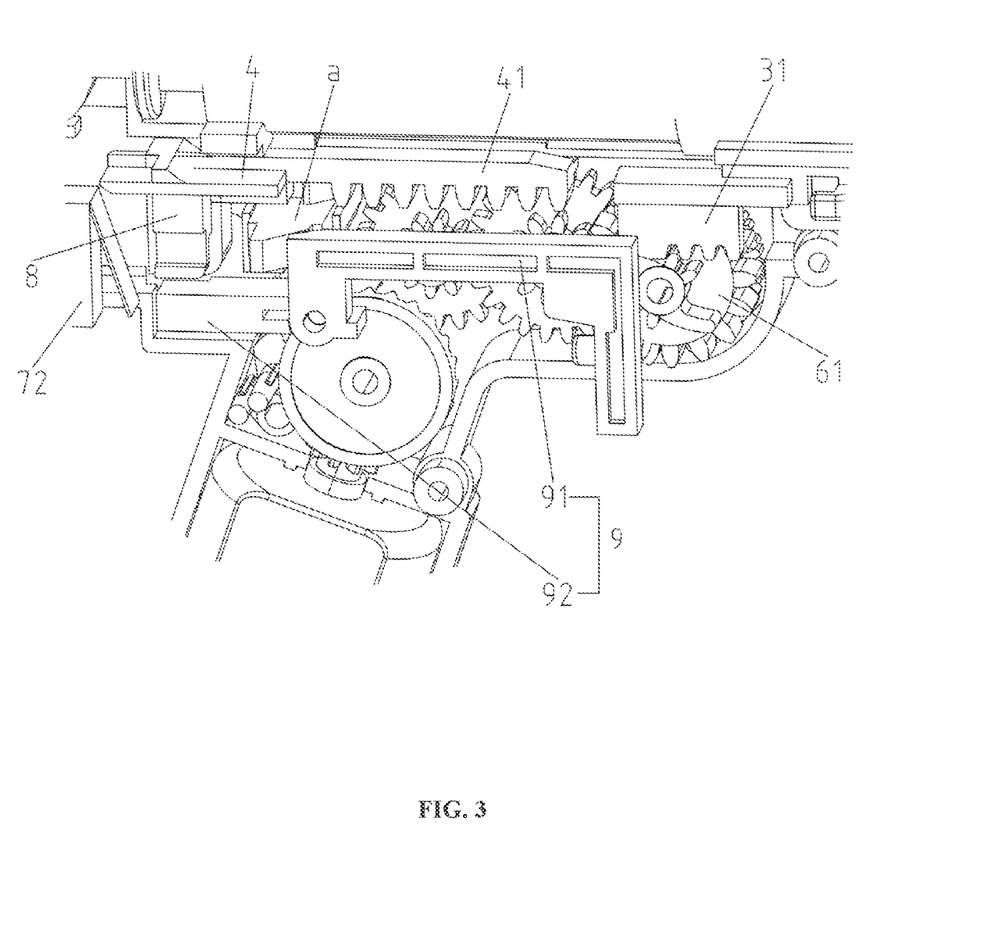
FIG. 3 illustrates a schematic diagram of an internal partial structure of a three-mode toy gun according to an embodiment of this application.
Figure 4:
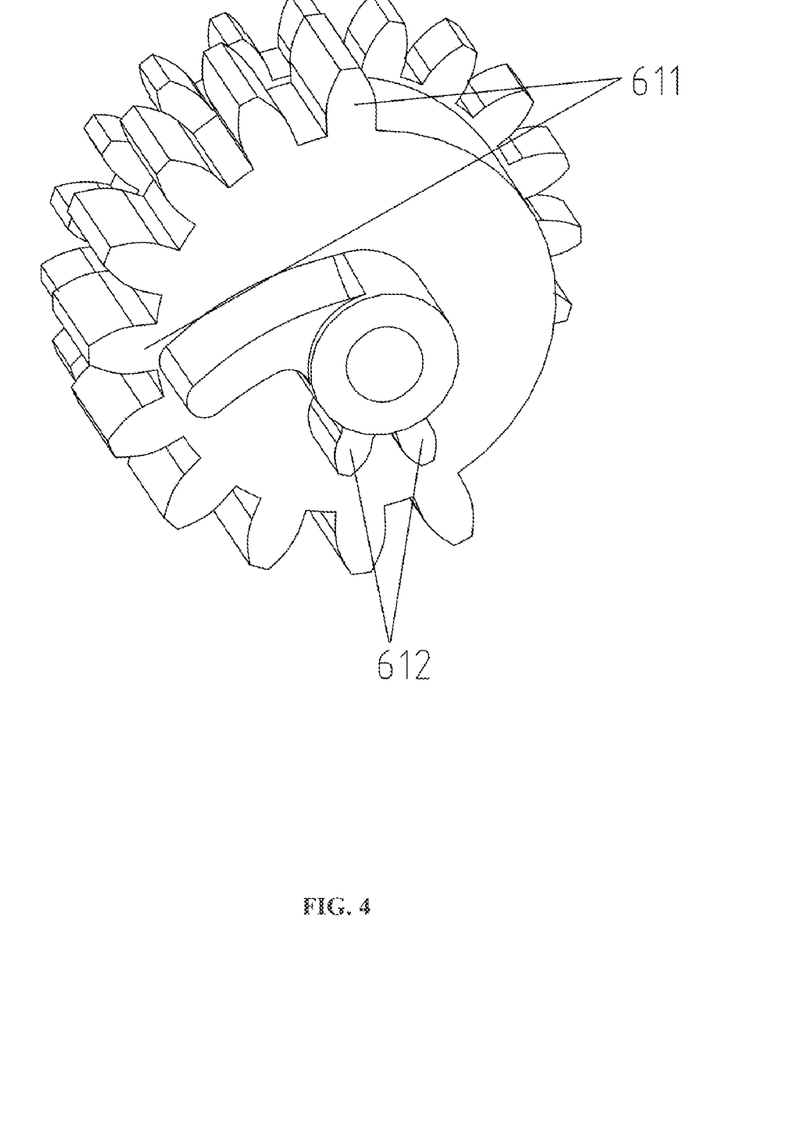
FIG. 4 illustrates a structural diagram of an output end gear of a three-mode toy gun according to an embodiment of this application.
Figure 5:
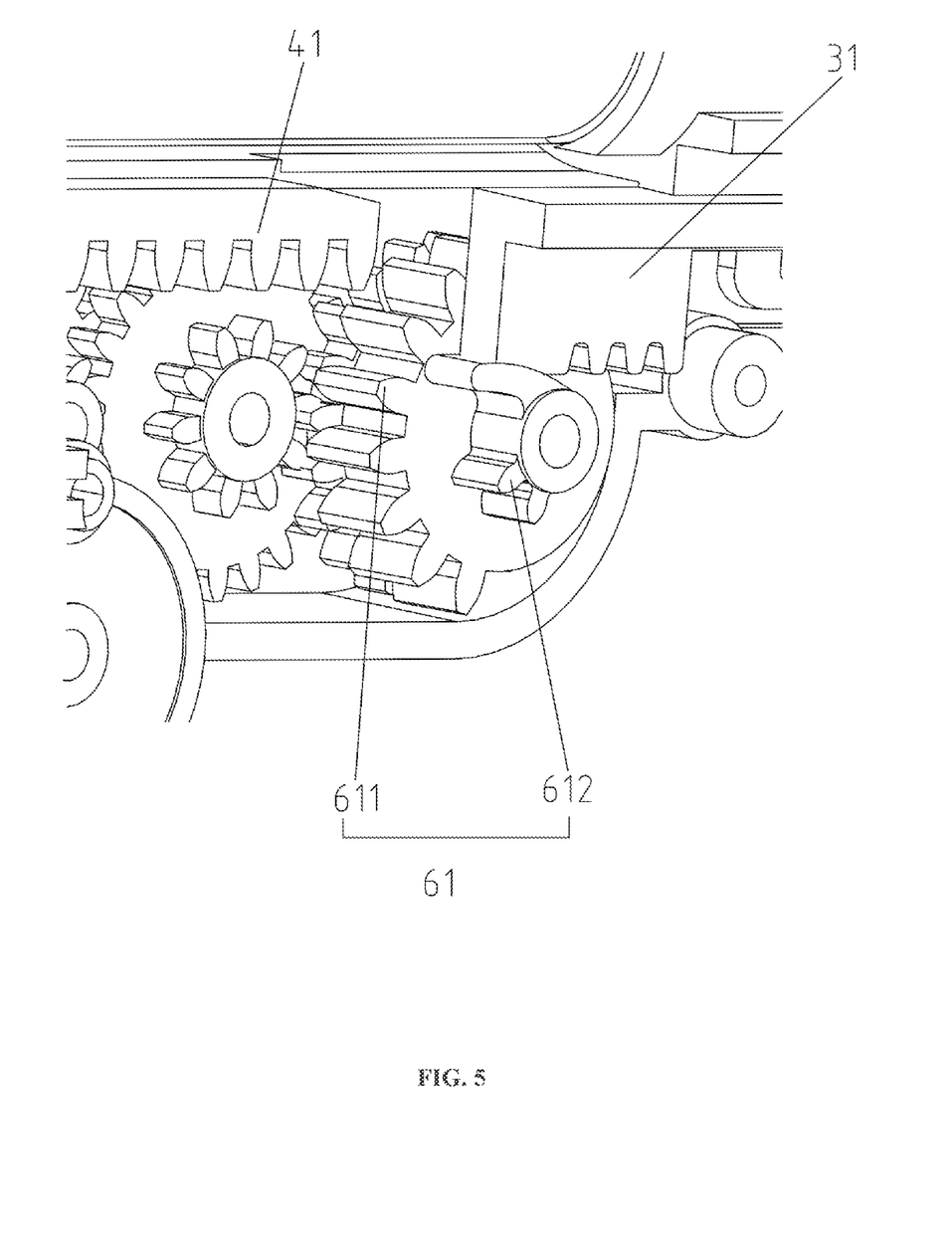
FIG. 5 illustrates a schematic diagram of a mating structure of a first rack, a second rack and an output end gear in a three-mode toy gun according to an embodiment of this application.

The piston member 4 has a push-down plate 42, and the push-down plate 42 has a push-down bevel. The mating member 8 has a mating bevel, the trigger 91 and the convex bar 92 are rotatably connected, and a second elastic member is provided between the trigger and the convex bar 92. The second elastic member may be a torsion arm spring. Both ends of the torsion arm spring abut against the trigger 91 and the convex bar 92 respectively, and the convex bar 92 is in a horizontal state as shown in FIG. 2 in the absence of an external force.

A third elastic member is provided between the mating member 8 and the gun shell 1; a fourth elastic member is provided between the trigger 91 and the gun shell 1; and in the single-action mode, the trigger is pressed, the piston member 4 moves towards the tail portion of the gun shell 1, the push-down bevel can press down the mating bevel, the mating member 8 presses down the convex bar 92, the first elastic member, the second elastic member, the third elastic member and the fourth elastic member are all in a deformed state, and when the mating member 8 presses down the convex bar 92 to rotate to deflect and disengage from the first switch 72, the first elastic member and the third elastic member both recover from deformation, and the convex bar 92 is limited at a bottom of the first switch 72. When the trigger is released, the fourth elastic member recovers from deformation to push against the trigger mechanism 9 away from the first switch 72, and the second elastic member recovers from deformation to drive the convex bar 92 to rotate to reset.

It should be noted that the first switch 72 in this application is a normally closed switch, the second switch 73 is a normally open switch, and pressing the first switch 72 can turn on the first switch 72, and pressing the second switch 73 can turn off the second switch 73.

Figure 9:
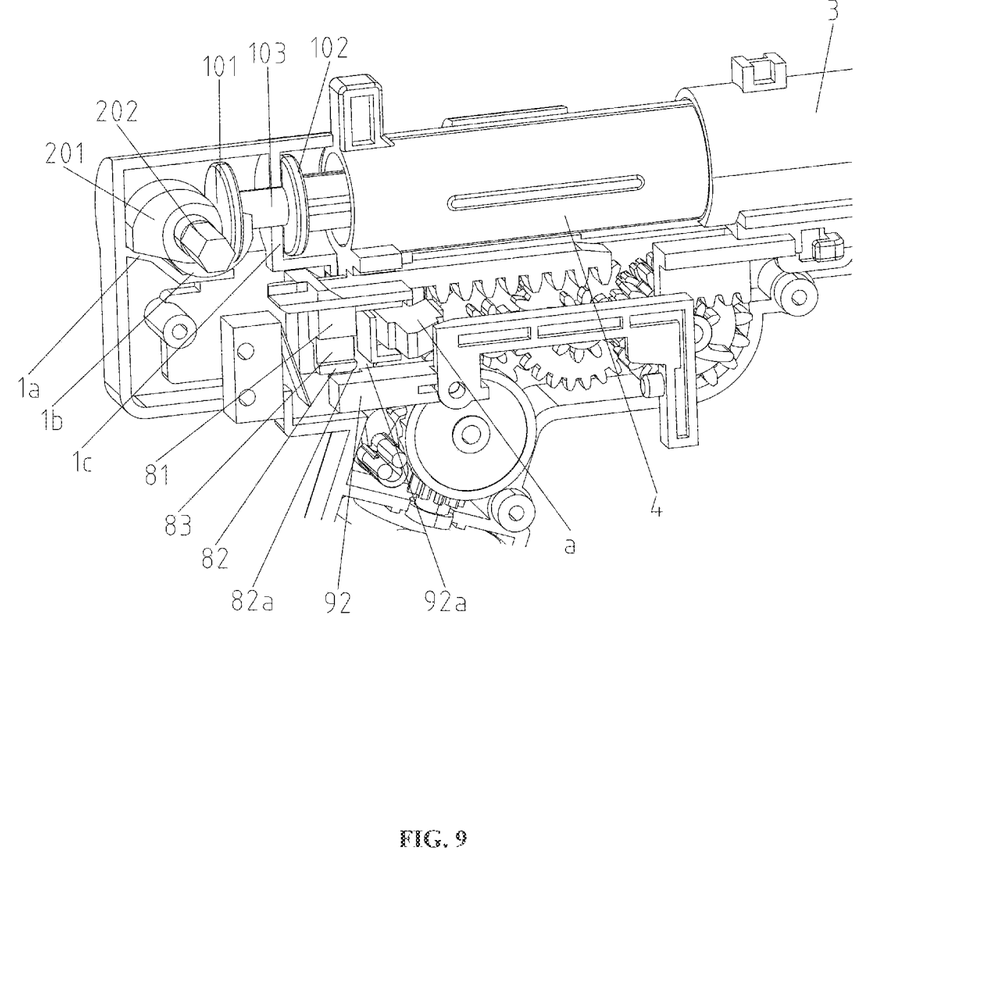
FIG. 9 illustrates another internal partial structure diagram of a three-mode toy gun according to an embodiment of this application.

Referring to FIG. 9, an avoidance groove 83 is provided on the mating member 8, and in the automatic mode, the convex bar 92 is arranged to at least partially run through the avoidance groove 83, and the trigger 91 is pressed, so that the convex bar 92 keeps abutting against the first switch 72. Even if the piston member 4 moves to the gun tail side, it does not press down the mating member 8, and the mating member 8 does not interfere with the convex bar 92. The convex bar 92 keeps the posture of pressing the first switch unchanged. As long as a user presses the trigger, the convex bar 92 remains triggering and abutting against the first switch 72, the first switch 72 remains conducted, and the toy gun continuously executes the firing action.

Referring to FIG. 9, an upper edge of an inner side of the convex bar 92 is provided with an inner convex rib 92a, and the mating member 8 has a lower convex rib 82 and an upper convex rib 81, the avoidance groove 83 is formed between the lower convex rib 82 and the upper convex rib 81, and a groove width of the avoidance groove 83 is greater than a width of the inner convex rib 92a. In the automatic mode, the mating member 8 moves to the second position, the inner convex rib 92a is located between the upper convex rib 81 and the lower convex rib 82, and the inner convex rib 92a runs through the avoidance groove 83. The piston member 4 does not interfere with the mating member 8 during the firing action of the toy gun. The mating member 8 does not press down the convex bar 92. As long as the trigger of the toy remains pressed, the toy gun continuously executes the firing action until the trigger is released.

In one possible implementation, an end portion of the lower convex rib 82 has a smooth outer arc surface 82a, and in the single-action mode, the mating member 8 abuts against an end portion of the inner convex rib 92a to drive the convex bar 92 to rotate. In a process that the mating member 8 moves from the first position to the second position, the end portion of the inner convex rib 92a slides along the outer convex arc surface 82a and slides into the avoidance groove 83.

The three-mode toy gun comprises a snap-on member a movably provided on the gun shell 1, and the snap-on member a is movable in a direction perpendicular to the piston member 4. In the manual mode, the piston member 4 moves towards the gun tail, the piston member is snappable on the snap-on member a, the first elastic member is in a compressed state, the trigger is pressed to drive the snap-on member a to move, so that the snap-on member a is disengaged from the piston member, and the first elastic member is elastically released to push against the piston member 4 to reset.

A fifth elastic member is provided between the snap-on member a and the gun shell 1. The trigger has a lateral push bevel. One end of the snap-on member a away from the fifth elastic member is provided with a lateral push mating bevel. In the state where the trigger is pressed, the lateral push bevel is capable of pushing against the lateral push mating bevel, so that the snap-on member moves and compresses the fifth elastic member.

Figure 6:
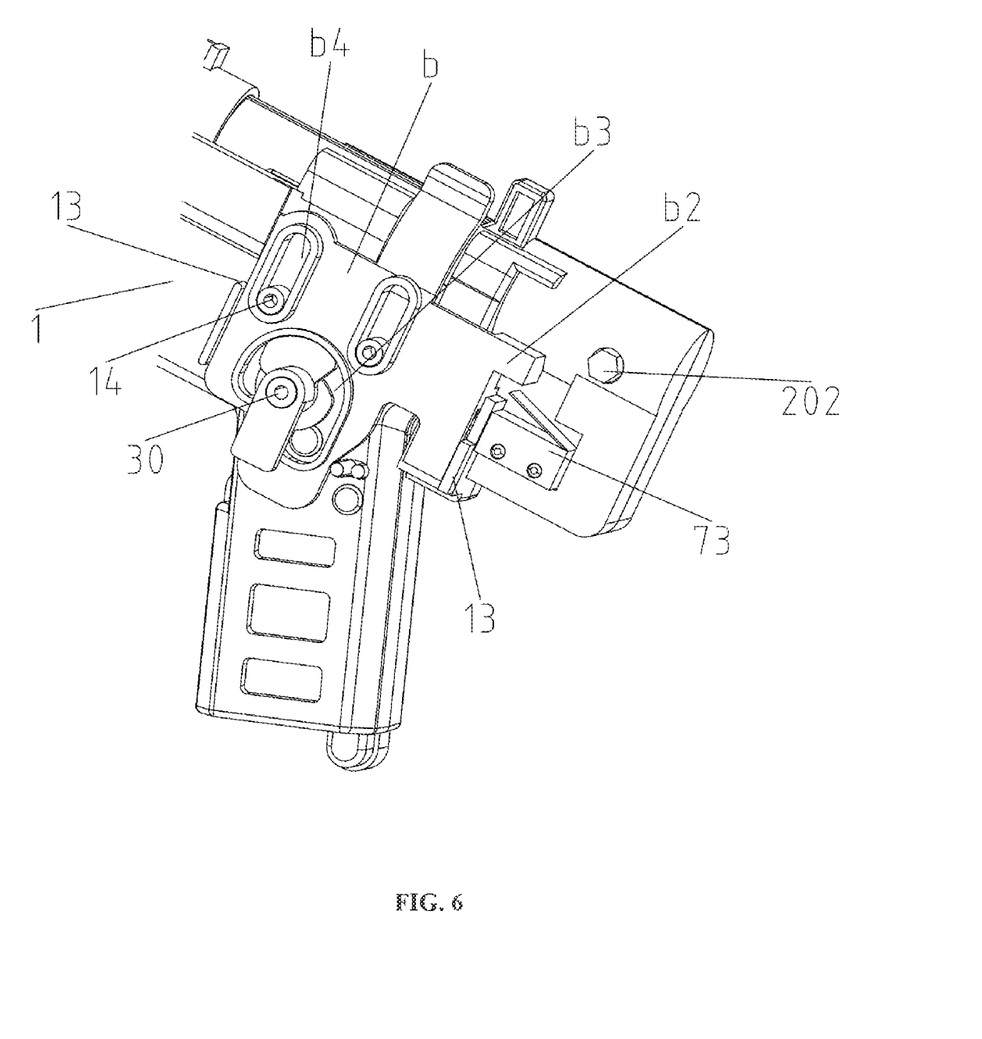
FIG. 6 illustrates a structural diagram of a second side of a three-mode toy gun according to an embodiment of this application.
Figure 7:
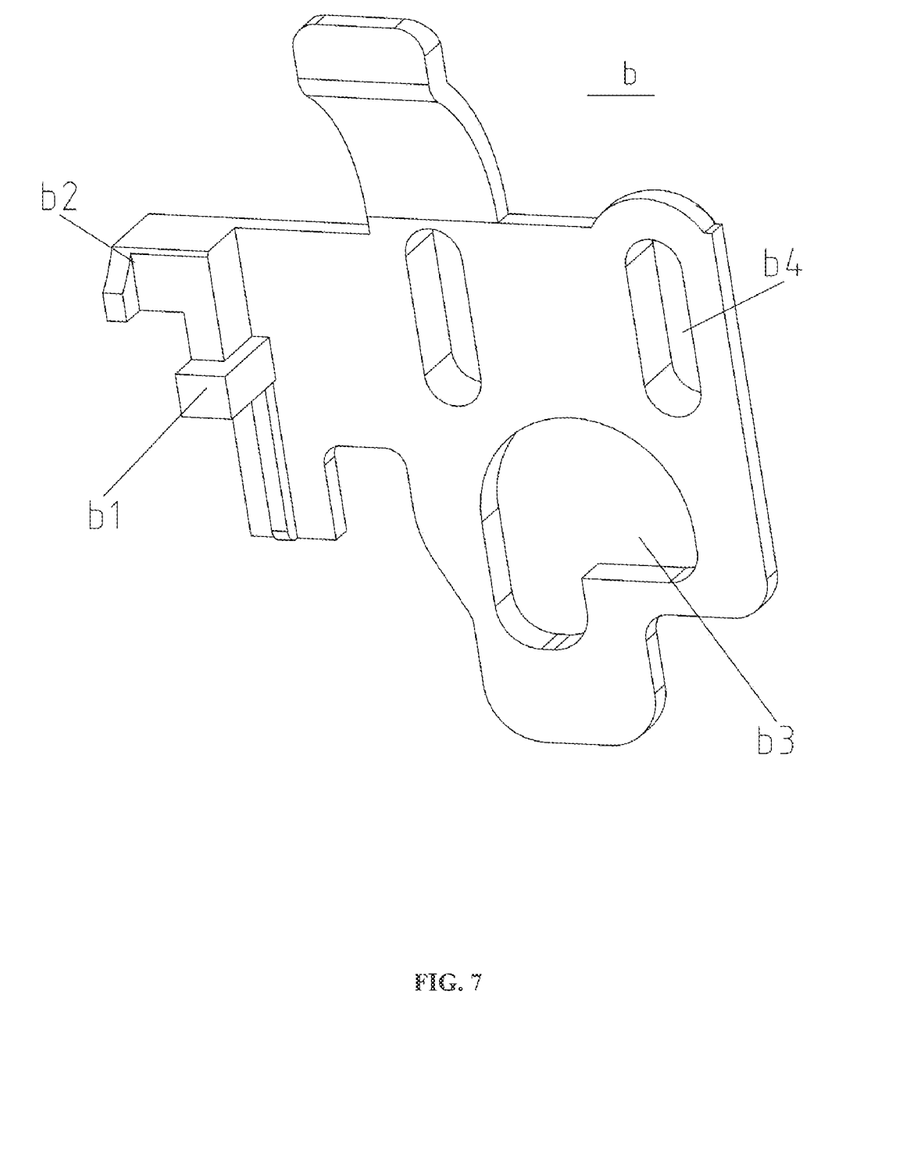
FIG. 7 illustrates a structural diagram of a mode adjustment plate of a three-mode toy gun according to an embodiment of this application.
Figure 8:
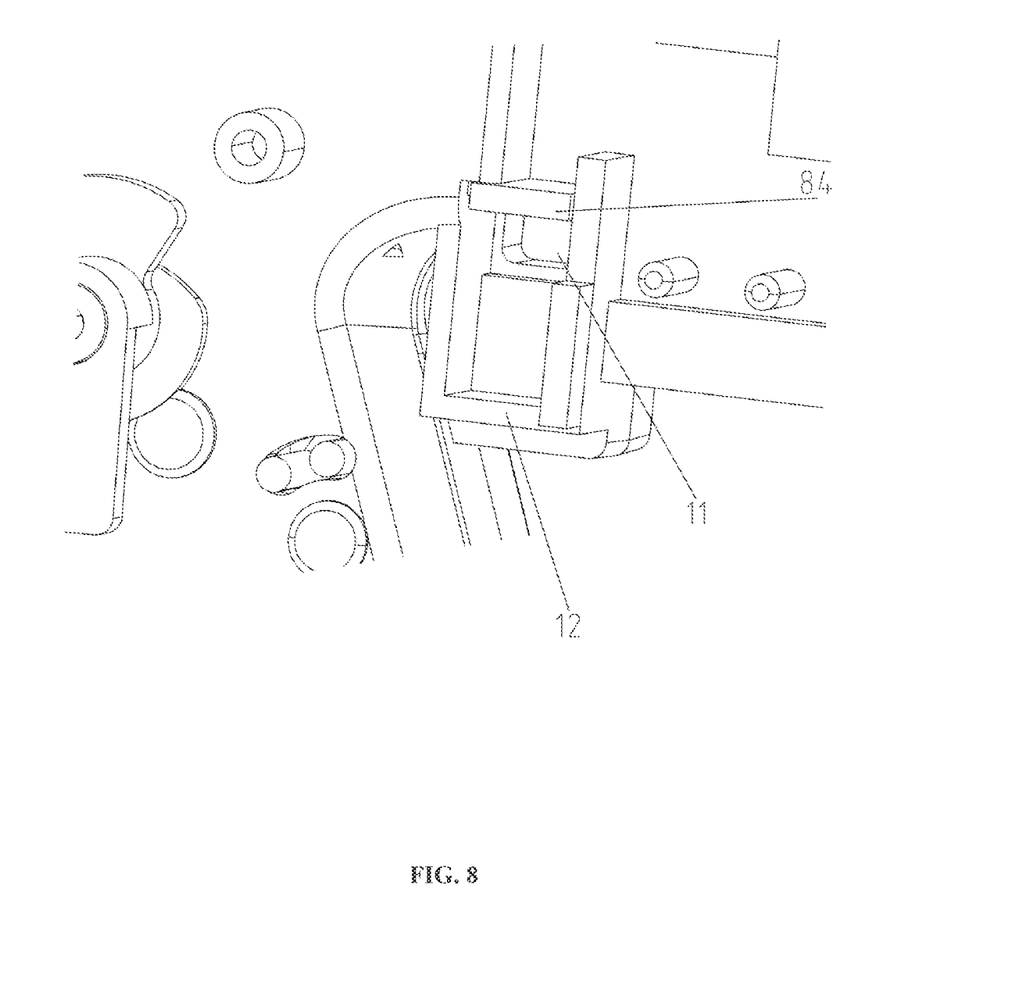
FIG. 8 illustrates a mating diagram of a mating member, a through groove and a support table in a three-mode toy gun according to an embodiment of this application.

Referring to FIGS. 6 and 8, the gun shell 1 has a through groove 11 and a support table 12, the mating member 8 has an extension 84, the support table 12 is located on the side of the extension 84 away from the piston member 4, the extension 84 extends to the through groove 11, and both ends of the fifth elastic member abut against the extension 84 and the support table 12 respectively. When the push-down bevel presses down the mating member 8, the fifth elastic member is in a compressed state, and when the push-down bevel is away from the mating member 8, the fifth elastic member pushes against the mating member 8 to reset.

In one possible implementation, as shown in FIG. 6, the three-mode toy gun comprises a mode adjustment plate b, two guide ribs 13 are provided on the gun shell 1, the mode adjustment plate b is slidably arranged between the two guide ribs 13, the mode adjustment plate b has a holding down plate b1, the holding down plate b1 extends to a side of the extension 84 away from the fifth elastic member, and the mode adjustment plate b is movable along the guide ribs 13 to adjust the mating member 8 to the first position or the second position.

The mating member 8 has a third position located on a side where the second position is away from the first position. In a state where the mating member 8 moves to the third position, the inner convex rib 92a runs through the avoidance groove 83. The mode adjustment plate b also has a trigger plate b2, and in a state where the mode adjustment plate b drives the mating member 8 to move to the third position, the trigger plate b2 presses the second switch 73 so that the second switch 73 is in an off state. At this time, the toy gun is in the manual mode.

Referring to FIG. 6, the mode adjustment plate b has an adjustment groove b3 and a plurality of guide grooves b4. A plurality of guide posts 14 are provided on the gun shell 1, and each of the guide posts 14 is respectively inserted into a corresponding guide groove b4. The rotating member 30 is arranged in the gun shell 1, the rotating member 30 is partially located in the adjustment groove b3, the rotating member 30 is rotatable to abut against different positions of the adjustment groove b3, so that the mode adjustment plate b limits the mating member 8 to any one of the first position, the second position and the third position.

Figure 10:
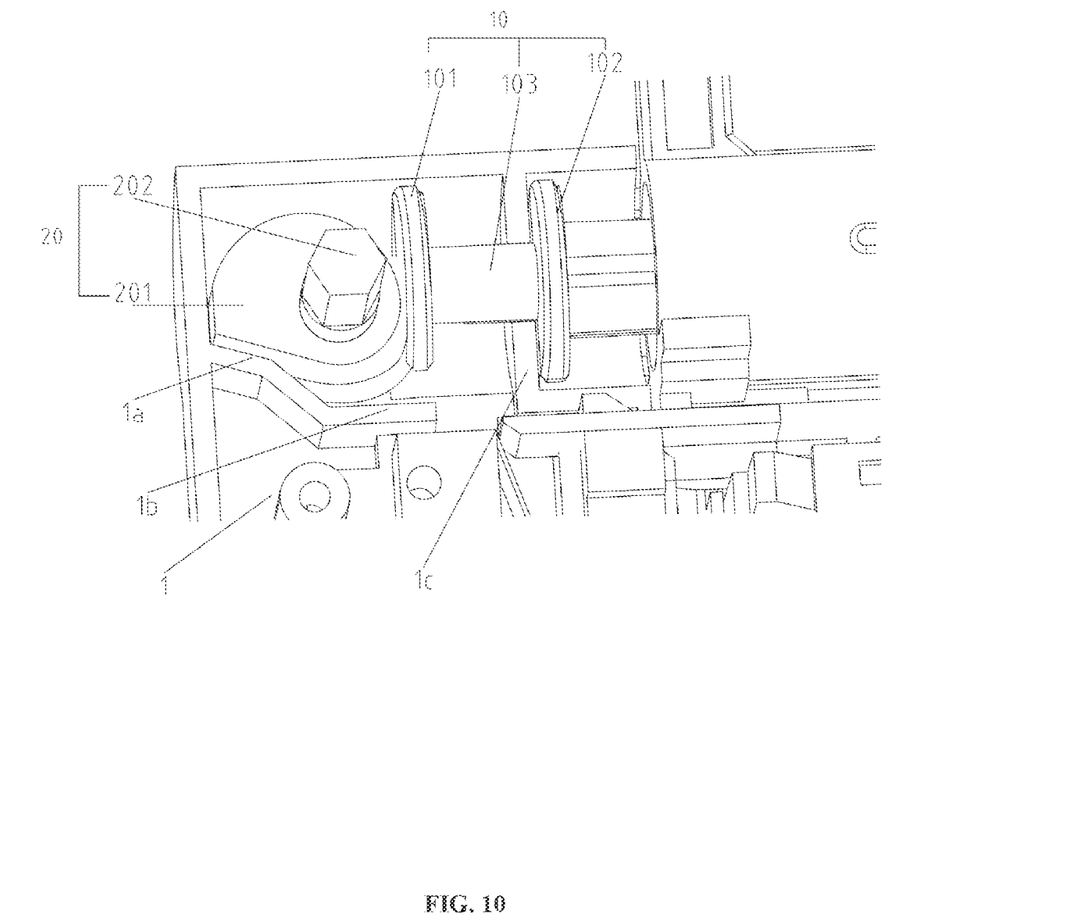
FIG. 10 illustrates a mating structure of an adjustment member and a spring seat in a three-mode toy gun according to an embodiment of this application.

Referring to FIG. 10, the adjustable elastic toy gun comprises a spring seat 10. The firing cylinder assembly is arranged in the gun shell 1, the firing cylinder assembly has an air cylinder 3 and a piston member 4, and the piston member 4 is slidably connected to the air cylinder 3. A first end of the first elastic member abuts against the piston member 4. The spring seat 10 is arranged in the gun shell 1, the spring seat 10 and a second end of the first elastic member are against each other, and the spring seat 10 can move and be positioned in a moving direction of the piston member 4. By adjusting the position of the spring seat 10, the amount of compression of the first elastic member after the toy gun is bored can be changed, thereby adjusting the range of bullets.

It should be noted that the toy gun has other structures not mentioned in this application in addition to the structures such as the firing cylinder assembly mentioned in this application. These structures not mentioned in this application can directly adopt the existing technologies, and this application only describes the improved structures in detail.

The adjustable elastic toy gun comprises an adjustment member 20, the adjustment member 20 is arranged in the gun shell 1, and the adjustment member 20 is in transmission fit with the spring seat 10 to drive the spring seat 10 to move. The adjustment member 20 can adopt various structures and can push against the spring seat 10, allowing the spring seat 10 to move.

For example, the adjustment member 20 comprises a cam 201 and a rotating shaft 202 connected to the cam 201, and the cam 201 abuts against the spring seat 10. The rotating shaft 202 is rotatably connected to the gun shell 1, and rotation of the cam 201 about the rotating shaft 202 pushes against the spring seat 10 to move.

The gun shell 1 has a first limiting wall 1a and a second limiting wall 1b therein, and the cam 201 abuts against the first limiting wall 1a in a state where the cam 201 rotates in a first direction to an extreme position. In a state where the cam 201 rotates in a second direction to the extreme position, the cam 201 abuts against the second limiting wall 1b. By arranging the first limiting wall 1a and the second limiting wall 1b, the cam 201 can be selected to two angles, so that the position of the spring seat 10 is stable. When the cams abut against a plurality of different limiting walls, the positions of the corresponding spring seats 10 are also different.

The gun shell 1 has a connecting hole, the cam 201 is located in the gun shell 1, and the rotating shaft 202 extends out of the gun shell 1 from the connecting hole. The rotating shaft 202 extends out of the connecting hole, so that the cam 201 can be rotated outside the toy gun through the rotating shaft 202 to adjust an angle of the cam 201.

The rotating shaft 202 may have a polygonal cross section. The rotating shaft 202 is conveniently twisted using a special tool. For example, a handle having a groove with a polygonal cross section may be fitted over the rotating shaft 202, and then the rotating shaft 202 is rotated by applying a force.

Optionally, the spring seat 10 has a first flat plate 101, and the cam 201 abuts against the first flat plate 101.

The first flat plate 101 has a flat surface that can come into contact with the cam 201. The cam 201 rotates to push against the entire spring seat 10 through the first flat plate 101 to move.

In one possible implementation, the spring seat 10 also has a second flat plate 102, and the first elastic member abuts against the second flat plate 102. A dividing wall 1c is provided in the gun shell 1, and a through hole is provided on the dividing wall 1c. The first flat plate 101 and the second flat plate 102 are respectively arranged on both sides of the dividing wall 1c. The spring seat 10 has a connecting shaft 103 connecting the first flat plate 101 and the second flat plate 102. The connecting shaft 103 runs through the through hole.

The preferred embodiments of this application disclosed above are intended to illustrate this application only. The preferred embodiments do not elaborate on all the details and do not limit this application to the specific implementations described only. Obviously, many modifications and variations are possible in light of the above teaching. The embodiments were chosen and described in order to better explain the principles and practical application of the invention, so that those skilled in the art can better understand and utilize this application. This application is only limited by the claims and their full scope and equivalents.

What is claimed is:

1. A three-mode toy gun, comprising:
   a gun shell;
   a firing cylinder assembly, wherein the firing cylinder assembly comprises a loading cylinder, an air cylinder and a piston member, the loading cylinder is fixed to the gun shell, the air cylinder is slidably connected to the loading cylinder, the piston member is slidably connected to the air cylinder, the piston member has a first rack and a push-down plate, the push-down plate has a push-down bevel, the air cylinder has a second rack, and a first elastic member is provided between the piston member and the gun shell;
   a transmission gear train, wherein an output end gear of the transmission gear train has a first incomplete gear and a second incomplete gear, the first incomplete gear is engageable with the first rack, and the second incomplete gear is engageable with the second rack;
   an electric drive mechanism, wherein the electric drive mechanism comprises a motor and a power supply cable, the motor is in transmission connection with an input end gear of the transmission gear train, the power supply cable is electrically connected with the motor, and the power supply cable has a first switch and a second switch connected in series;
   a mating member, wherein the mating member is movably arranged in the gun shell, the mating member has a first position, a second position and a third position, in the first position the mating member is located in line with the piston member, and the mating member located at the second position does not interfere with the piston member, the third position is located on a side where the second position is away from the first position, the mating member has a mating bevel, a third elastic member is provided between the mating member and the gun shell, the mating member has a lower convex rib and an upper convex rib, and an avoidance groove is formed between the lower convex rib and the upper convex rib;
   a trigger mechanism, wherein the trigger mechanism is arranged in the gun shell, the trigger mechanism has a trigger and a convex bar, the trigger and the convex bar are rotatably connected, a second elastic member is provided between the trigger and the convex bar, and both ends of the second elastic member abut against the trigger and the convex bar respectively, a fourth elastic member is provided between the trigger and the gun shell, an upper edge of an inner side of the convex bar is provided with an inner convex rib, a groove width of the avoidance groove is greater than a width of the inner convex rib, and an end portion of the lower convex rib has a smooth outer convex arc surface;

a mode adjustment plate, wherein the mode adjustment plate is movably arranged in the gun shell, and two guide ribs are provided on the gun shell, the mode adjustment plate is slidably arranged between the two guide ribs, and the mode adjustment plate is movable along the guide ribs to adjust the mating member to the first position or the second position;

a rotating member, wherein the mode adjustment plate has an adjustment groove and a plurality of guide grooves, a plurality of guide posts are provided on the gun shell, and each of the guide posts is respectively inserted into a corresponding guide groove, and the rotating member is arranged in the gun shell, the rotating member is partially located in the adjustment groove, and the rotating member is rotatable to abut against different positions of the adjustment groove, so that the mode adjustment plate limits the mating member to any one of the first position, the second position and the third position;

wherein the three-mode toy gun has a single-action mode, an automatic mode and a manual mode;

in the single-action mode, the mating member is located at the first position, the trigger is pressed, the piston member moves towards the tail portion of the gun shell, the push-down bevel can press down the mating bevel, the mating member presses down the convex bar, the first elastic member, the second elastic member, the third elastic member and the fourth elastic member are all in a deformed state, and when the mating member presses down the convex bar to rotate to deflect and disengage from the first switch, the first elastic member and the third elastic member both recover from deformation, and the convex bar is limited at a bottom of the first switch, when the trigger is released, the fourth elastic member recovers from deformation to push against the trigger mechanism away from the first switch, and the second elastic member recovers from deformation to drive the convex bar to rotate to;

in the automatic mode, the mating member is located at the second position, the inner convex rib is located between the upper convex rib and the lower convex rib, and the inner convex rib runs through the avoidance groove, and in a state where the trigger is pressed, the convex bar keeps abutting against the first switch, and the electric drive mechanism remains in a power-on state, and in a process that the mating member moves from the first position to the second position, the end portion of the inner convex rib slides along the outer convex arc surface and slides into the avoidance groove; and in the manual mode, the mating member is located at the third position, the second switch is trigged and in an off state, and the electric drive mechanism remains in a power-off state.

2. The three-mode toy gun according to claim 1, wherein the three-mode toy gun comprises a snap-on member movably provided in the gun shell;

the snap-on member is movable in a direction perpendicular to the piston member; and in the manual mode, the piston member moves towards a gun tail, the first elastic member is in a compressed state, the trigger is pressed to drive the snap-on member to move, so that the snap-on member is disengaged from the piston member, and the first elastic member is elastically released to push against the piston member to reset.

3. The three-mode toy gun according to claim 2, wherein a fifth elastic member is provided between the snap-on member and the gun shell;

the trigger has a lateral push bevel;

one end of the snap-on member away from the fifth elastic member is provided with a lateral push mating bevel; and in the state where the trigger is pressed, the lateral push bevel is capable of pushing against the lateral push mating bevel, so that the snap-on member moves and compresses the fifth elastic member.

4. The three-mode toy gun according to claim 3, wherein the gun shell has a through groove and a support table;

the mating member has an extension;

the support table is located on a side of the extension away from the piston member;

the extension extends to the through groove; and both ends of the fifth elastic member abut against the extension and the support table respectively.

5. The three-mode toy gun according to claim 4, wherein two guide ribs are provided on the gun shell;

the mode adjustment plate is slidably arranged between the two guide ribs;

the mode adjustment plate has a holding down plate;

the holding down plate extends to a side of the extension away from the fifth elastic member; and the mode adjustment plate is movable along the guide ribs to adjust the mating member to the first position or the second position.

6. The three-mode toy gun according to claim 5, wherein in a state where the mating member moves to the third position, the inner convex rib runs through the avoidance groove; and the mode adjustment plate also has a trigger plate, and in a state where the mode adjustment plate drives the mating member to move to the third position, the trigger plate presses the second switch so that the second switch is in an off state.

* * * * *